(No Model.) 2 Sheets—Sheet 1.

A. STANSEL.
BROADCAST SEEDER.

No. 368,555. Patented Aug. 16, 1887.

WITNESSES:
T. F. Gardner
Edm. P. Ellis

INVENTOR:
A. Stansel,
per F. A. Lehmann, atty (No Model.) 2 Sheets—Sheet 2.

A. STANSEL.
BROADCAST SEEDER.

No. 368,555. Patented Aug. 16, 1887.

WITNESSES:
L. F. Gardner
Edm. P. Ellis

INVENTOR:
A. Stansel,
per F. A. Lehmann,
atty

United States Patent Office.

ALONZO STANSEL, OF YORKVILLE, ILLINOIS.

BROADCAST-SEEDER.

SPECIFICATION forming part of Letters Patent No. 368,555, dated August 16, 1887.

Application filed May 18, 1887. Serial No. 238,664. (No model.)

*To all whom it may concern:*

Be it known that I, ALONZO STANSEL, of Yorkville, in the county of Kendall and State of Illinois, have invented certain new and useful Improvements in Broadcast-Seeders; and I do hereby declare the following to be a full, clear, and exact description of the invention, such as will enable others skilled in the art to which it pertains to make and use it, reference being had to the accompanying drawings, which form part of this specification.

My invention relates to an improvement in broadcast-seeders; and it consists in, first, the combination of the driving-wheels, having openings through their centers, with the feed-box, which has its ends passed through the openings in the driving-wheels, and which box serves to connect the wheels together, and the dropping mechanism placed in the bottom of the box and which is operated by the driving-wheels; second, the combination of the driving-wheels having openings through their centers, a seed-box which extends through both of the wheels at its ends and serves as an axle for connecting the wheels together, seed-dropping wheels in the seed-box, and a mechanism for operating the seed-dropping wheels from the driving-wheels; third, the combination of the driving-wheels, having openings through their centers, and internally-toothed hubs, the seed-box working in the hubs, shafts journaled in the seed-box, seed-dropping wheels on the shafts, and a pinion on the seed-shafts and connecting the teeth of the hubs; fourth, the combination of the driving-wheels having openings through their centers and provided with internally-toothed hubs, and friction-wheels on opposite sides of the hub, of a seed-box provided with flanges upon which the friction-wheels work, and, fifth, the arrangement and combination of devices, which will be more fully described hereinafter, and set forth in the claims.

The object of my invention is to construct a seeder in which the seed-box is passed directly through the center of the driving-wheels, which can be arranged near together without decreasing the capacity of the seeder, and to place inside of the stationary feed-box, around which the wheels revolve, a feeding mechanism which can be readily and quickly adjusted for sowing different quantities or kinds of seed.

Figure 1:
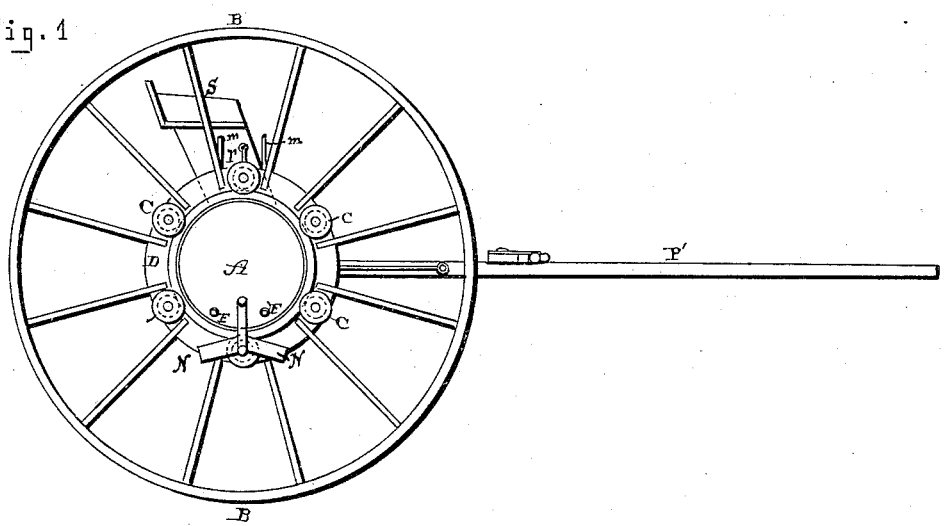
Figure 3:
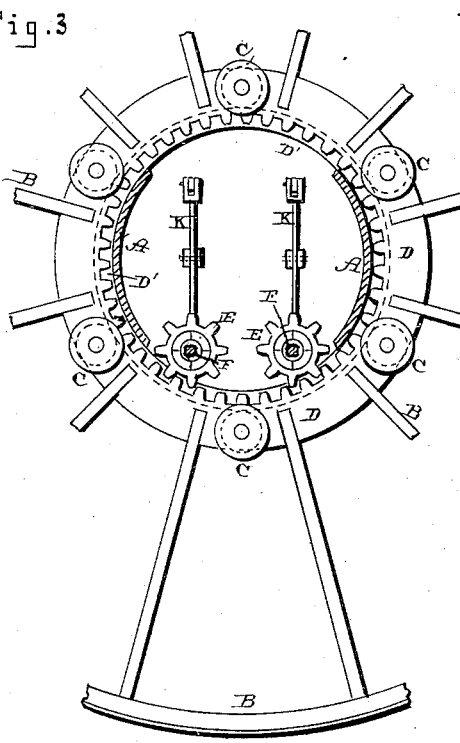
Figure 4:
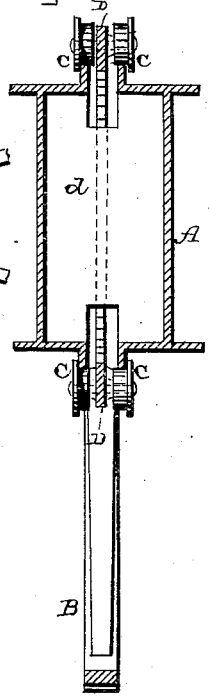
Figure 5:
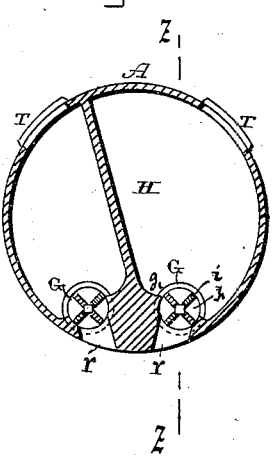
Figure 2:
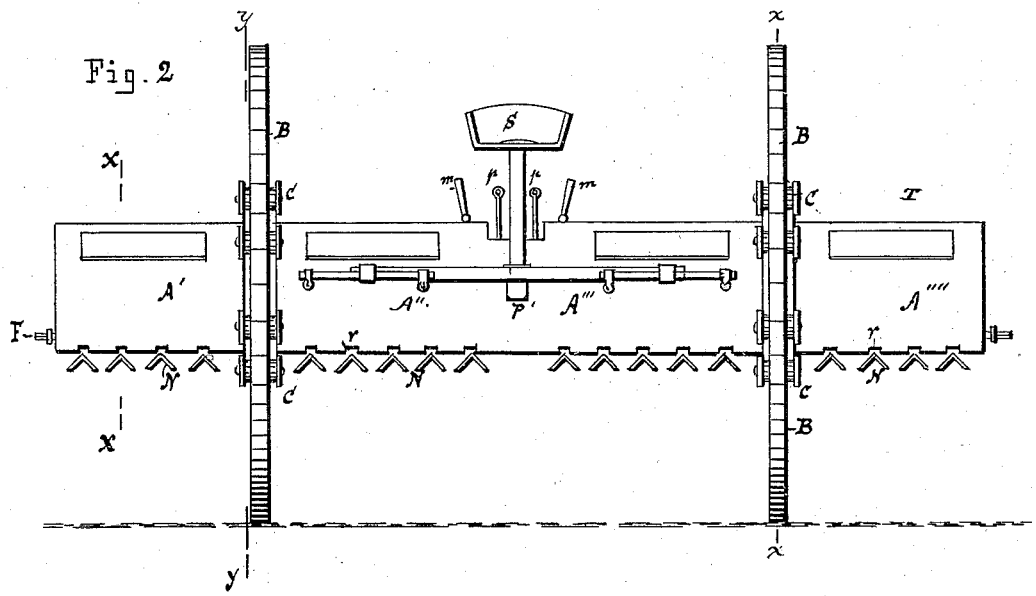
Figure 6:
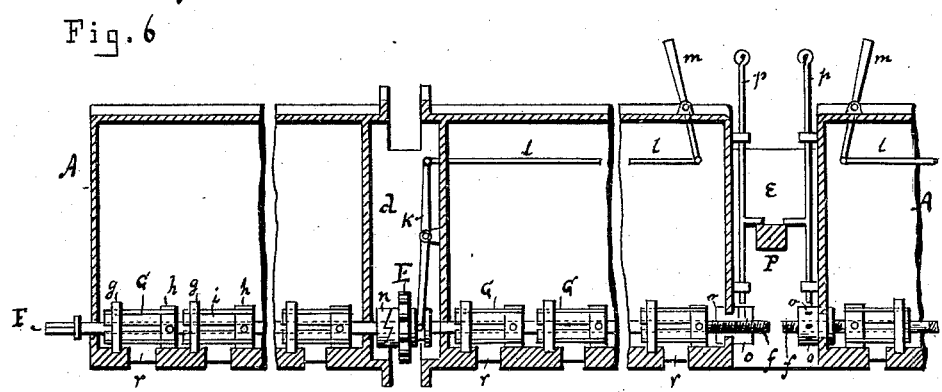

Figure 1 is a side elevation of my improvement. Fig. 2 is a front elevation of the same. Fig. 3 is a section on line $y\,y$ of Fig. 2, the spokes and rim of the wheel being broken away. Fig. 4 is a section on line $z\,z$ of Fig. 5, a portion only of the rim being shown. Fig. 5 is a section on line $x\,x$ of Fig. 2. Fig. 6 is a longitudinal section of the seed box or hopper, partly broken away. Figs. 7, 8, 9, and 10 are detail views of the feeding mechanism.

Similar letters of reference indicate corresponding parts in all the figures.

In constructing a mechanism such as shown in the above-described drawings I provide a round seed box or hoppper, A, which can be of any desired length and which serves as an axle for the wheels B. The wheels B are formed with hubs D, having teeth D' on their inner surfaces, for a purpose hereinafter described.

Friction-wheels C rest upon flanges secured to or made integral with seed box or hopper A, so that as the wheels B revolve the friction-wheels will revolve on the flanges of the hopper, the friction-wheels being held on the flanges by collars, between which and the hub D they are journaled.

Figure 8:
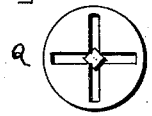
Figure 7:
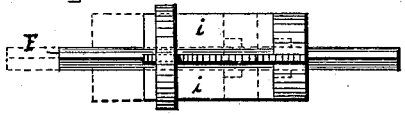
Figure 9:
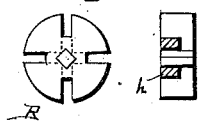
Figure 10:
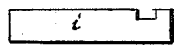

The seed box or hopper is composed of four or more compartments, A' A" A'" A"", each of which is divided into two compartments by a partition, H, as clearly shown in Fig. 5, one for grain and the other for grass-seed. Between the several compartments A' A" A'" A"" there is a space for the mechanism hereinafter described. In the bottom of each compartment openings are made, and over these openings the feed-wheels G are arranged. The feed-wheels G are mounted on shafts F, which extend to the space between the compartments A" and A'", and have their outer ends squared to receive a crank or wrench and their inner ends screw-threaded. On the screw-threaded ends are the nuts O, having indentations for the reception of the sliding rods P, when it is desired to adjust the shafts for regulating the size of the seed-dropping wheels G. On the shafts F, between the compartments A' and A" and A'" and A"", are secured the pinions E, which mesh with the teeth D' of the hubs D of the wheels, so that the seed-dropping wheels will be revolved by the revolution of the wheels B. The pinions E are fitted to slide on the shafts F, and are provided with clutch-teeth for engaging the clutch-teeth of the collars n, rigidly secured to the shafts F. The pinions E are moved back and forth on the shafts by means of the levers K M and connecting-rod l. The seed-dropping wheels G are composed of two collars, Q R, and the plates I. The collar R is rigidly secured to the shafts F, and is provided with radial notches or recesses, as shown in Fig. 9, and the collar Q is loosely fitted on the shaft and is provided with radial slots extending from the center to nearly the periphery, as shown in Fig. 8. The plates I are notched at one end and rest in the notches of the collar R, while their other ends project through the slots of the collar Q. The collar R rests in the bottom of the seed-box, and the collar Q in recesses therein.

The seed box or hopper A is provided with supply-openings closed by covers T, and below the discharge openings of the hopper are arranged the inclined distributers N. P' is the tongue, and S the driver's seat.

The operation is as follows: The seed having been placed in the seed box or hopper, the teeth of the hubs, meshing with the pinions E, will cause the shafts F to be revolved, and thereby the seed-dropping wheels G, so that the grain and grass-seed will be discharged through the openings in the bottom of the hopper upon the inclined distributers, from which they fall to the ground. When it is desired to throw the seed-dropping mechanism out of gear, when turning at the end of a row or for transporting from one place to another, it is only necessary to operate the levers M, which will cause the pinions E to slide upon the shafts out of gear with the teeth of the driving-wheel hubs, when the seed-dropping wheels will cease to revolve. To adjust the seed-dropping wheels for sowing various quantities of grain or grass-seed, the sliding pins P are let down into the indentations of the nuts O on the ends of the shafts F, and a crank or wrench applied to the ends of the shafts F, when the shaft will be moved endwise. This endwise movement of the shafts F will cause the collars Q and R to approach or recede from each other and the plates I to project more or less through the collar Q, owing to the direction in which the shafts are turned, thereby increasing or decreasing the size of the pockets of the wheels. By my construction I am enabled to use a long seed box or hopper, thereby increasing its capacity and at the same time avoiding the necessity of having the wheels so far apart, which has been found to be objectionable.

Although I have shown my seed-hopper provided with four compartments each divided into two, yet it is evident that more or less could be used, and that only grain or seed compartments could be employed.

Having thus described my invention, I claim—

1. In a planter, the combination of the driving-wheels, having openings through their centers, with a stationary seed-box, which is passed through the openings in the driving-wheels and which serves to connect the wheels together, and the seed-dropping mechanism placed in the bottom of the box and which is operated from the driving-wheels, substantially as shown.

2. In a planter, the combination of wheels, a seed-box serving as an axle for the wheels, seed-dropping wheels in the seed-box, and mechanism for operating the seed-dropping wheels from the driving-wheels, substantially as herein described.

3. In a planter, the combination of wheels having internally-toothed hubs, a seed-box working in the hubs, shafts journaled in the seed-box, seed-dropping wheels on the shafts, and a pinion on the said shafts and engaging the teeth of the hubs, substantially as herein described.

4. In a planter, the combination, with the wheels B, provided with the internally-toothed hubs D D', and the friction-wheels on opposite sides of the hub, of a seed-box, A, provided with flanges upon which the friction-wheels work, substantially as herein shown and described.

5. In a planter, the combination, with the wheels B, having the internally-toothed hubs D D' and the friction-wheels C on opposite sides of the hub, of the seed-box A, provided with flanges upon which the friction-wheels work, the shafts F, the pinions E, meshing with the teeth of the hubs, the seed-dropping wheels G on the shafts, and means for throwing the pinion out of gear, substantially as herein shown and described.

6. In a planter, the combination with the seed-box A, divided by the partition H, and having discharge-openings in its bottom, of the seed-dropping wheels G and means for operating the said wheels, substantially as described.

7. In a planter, the combination, with the seed-box A, the shaft F, having a screw-threaded end, the nut O thereon, and means for locking the nut, of the collar R, secured to the shaft, the plates I, secured to the collar, and a collar, Q, through which the plates slide, substantially as herein shown and described.

In testimony whereof I affix my signature in presence of two witnesses.

ALONZO STANSEL.

Witnesses:
GEO. L. CORNELL,
GEO. ELLIOTT.